US006259788B1

(12) United States Patent
Caruso

(10) Patent No.: US 6,259,788 B1
(45) Date of Patent: Jul. 10, 2001

(54) TECHNIQUE FOR BALANCING LOADS IN A COMMUNICATION NETWORK

(75) Inventor: John T. Caruso, Bound Brook, NJ (US)

(73) Assignee: Lucent Technologies Inc, Murray Hill, NJ (US)

( * ) Notice: Subject to any disclaimer, the term of this patent is extended or adjusted under 35 U.S.C. 154(b) by 0 days.

(21) Appl. No.: 09/019,454

(22) Filed: Feb. 5, 1998

(51) Int. Cl.[7] .......................... H04M 1/76; H04M 11/00
(52) U.S. Cl. .................. 379/414; 379/394; 379/39.26
(58) Field of Search .................. 379/414–416, 379/398–400, 394, 397, 93.26, 93.05–39.07, 167

(56) References Cited

U.S. PATENT DOCUMENTS 5,802,152 * 9/1998 DeLaine, Jr. .................. 379/93.26

* cited by examiner

Primary Examiner—Wing F. Chan

(57) ABSTRACT

In a telephone network, different telephones are connected to a telephone line in a parallel manner. When two or more of the telephones are in use and conduct electricity, known as an "off-hook" condition, they are oftentimes provided with varying amounts of loop current from the telephone line to drive their telephone circuitry. To balance the respective loop current supplies to the off-hook telephones, at least one inventive balancing network is used and connected to one of the off-hook telephones which has the least operating resistance, with respect to all other off-hook telephones.

17 Claims, 3 Drawing Sheets

100

TECHNIQUE FOR BALANCING LOADS IN A COMMUNICATION NETWORK

FIELD OF THE INVENTION

The invention relates to a technique for improving a service in a communications network, and more particularly to a technique for balancing loads in a telephone network to improve a telephone service.

BACKGROUND OF THE INVENTION

In this information age, virtually every home in the United States has one or more telephone lines for connecting telephone equipment to a public switched telephone network (PSTN) to realize voice communications. Each telephone line typically comprises a pair of copper wires forming a two-way communication path.

Telephone lines are traditionally distributed to a home from a central office, serving as a gateway to the PSTN, via a distribution cable composed of many plastic-insulated copper wires twisted together into pairs. Recently, to share facility to provide both cable television (CATV) service and telephone service, a coaxial cable was used to transport both CATV signals and voice communications between the central office and a home. The coaxial cable runs from the central office and is terminated at a network interface unit (NIU) outside the home, from which individual CATV and telephone lines extend into the home.

In either event, when the telephone equipment connected to any such telephone line is in use and conducts electricity, known as an "off-hook" condition, it draws current from the telephone line, referred to as "loop current," for voice communications. However, the amount of loop current available from the telephone line is limited.

It is common that a telephone line in a home is connected in a parallel manner to multiple telephones of different varieties, e.g., of different manufacturers and models, corded versus cordless, etc. The multiple telephones are sometimes used simultaneously by different users to participate in the same telephone conversation. In that case, each of the off-hook telephones draws loop current from the telephone line. Because of the limited loop current supply, one or more of the off-hook telephones oftentimes draw insufficient loop current, causing their audio level to drop significantly from the desired level, so much so that it may become undetectable. As a result, the user of one such telephone can hardly participate in the telephone conversation.

An obvious solution to the above-identified problem is to increase the limit of the loop current afforded by each telephone line. However, such an increase calls for a telephone company's adding facilities for supplying loop current to support the telephone lines serviced thereby, and each of such facilities is costly. The actual number of the additional facilities required depends on the number of the telephone lines in service, which is extremely large. As a result, such additional facilities represent a huge extra cost to the telephone company, and the above solution is thus not economically feasible.

SUMMARY OF THE INVENTION

I have discovered that, notwithstanding the limited loop current supply, the above-identified problem mostly occurs when at least one of the multiple off-hook telephones connected to the same telephone line draws more than sufficient loop current from the telephone line, leaving at least another off-hook telephone with insufficient loop current. I have also recognized that the disproportionate distribution of the loop current to the telephones is attributable to an imbalance of the loads imparted by the telephones to the telephone line.

The invention overcomes the prior art limitations by including, in the prior art arrangement described above, a balancing network for affecting the resistance of at least one of the loads to substantially balance the loads. In an illustrative embodiment, the balancing network in accordance with the invention comprises at least one resistor. The balancing network is connected to the telephone having the least resistance of all off-hook telephones. Advantageously, with the balancing network, each off-hook telephone draws more balanced loop current to achieve its normal audio level, with respect to the off-hook telephone in the prior art arrangement.

BRIEF DESCRIPTION OF THE DRAWING

In the drawing.

Throughout this disclosure, unless otherwise stated, like elements, components and sections in the figures are denoted by the same numerals.

DETAILED DESCRIPTION

Figure 1:
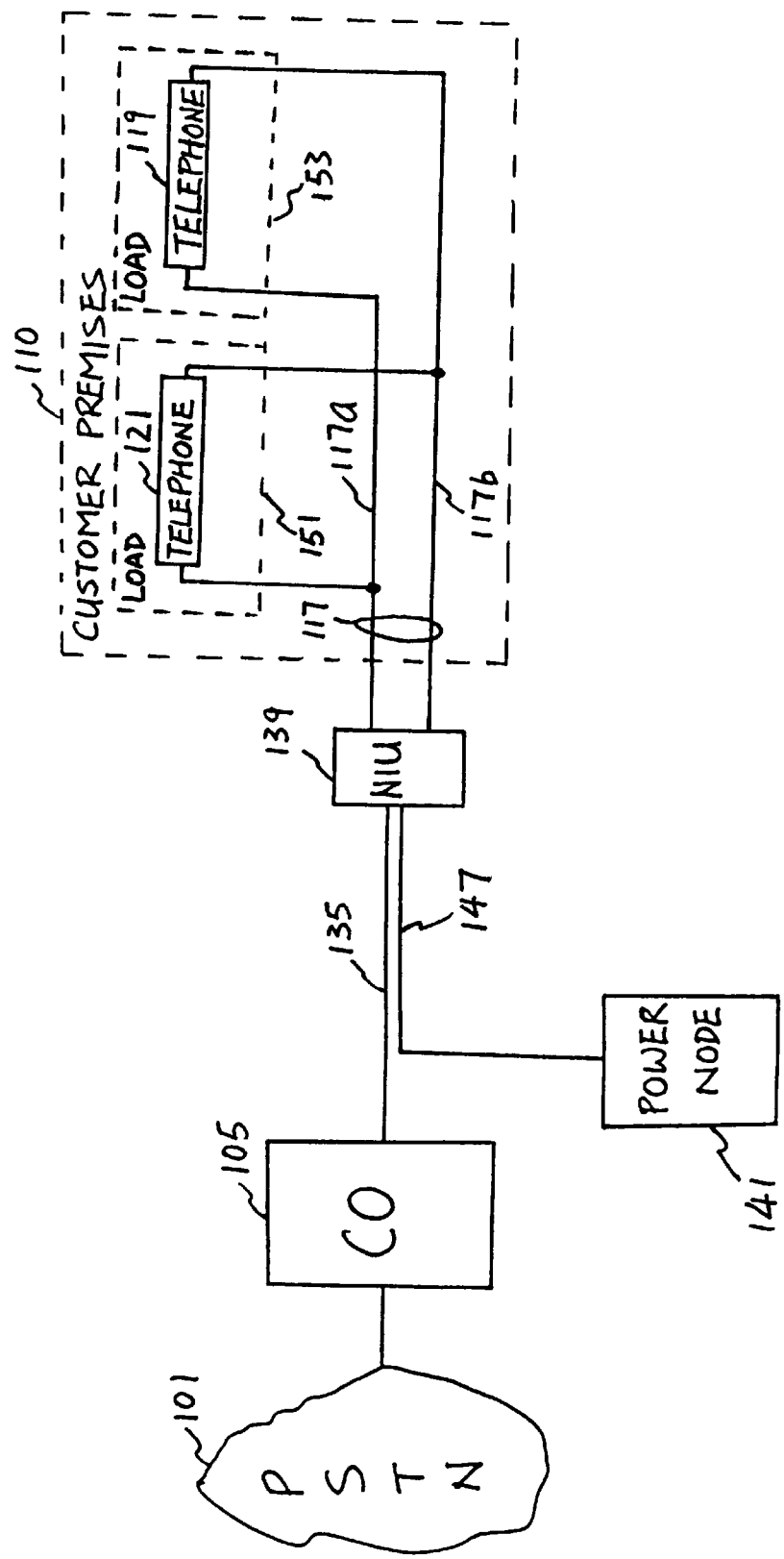
FIG. 1 illustrates a prior art communications arrangement.

FIG. 1 illustrates prior art communications arrangement 100 where customer premises 110, e.g., a home, is provided with a communications line, e.g., telephone line 117 for voice communications. Telephone line 117 comprises a pair of copper wires, denoted 117a and 117b, forming a two-way communication path. Wire 117a, conventionally referred to as a "TIP" lead, normally assumes a higher electric potential with respect to wire 117b, conventionally referred to as a "RING" lead. Telephone line 117 connects communication apparatuses, for example, telephones 119 and 121, to public switched telephone network (PSTN) 101 to realize the voice communications.

To that end, coaxial cable 135 which runs from central office 105, serving as a gateway to PSTN 101, is used to transport the voice communications. Cable 135 is terminated at network interface unit (NIU) 139 outside customer premises 110 from which telephone line 117 extends into premises 110. In this instance, to share facility to provide both cable television (CATV) service and telephone service to customer premises 110, coaxial cable 135 is also used to transport CATV signals. Although in this instance a CATV line providing the CATV service and a telephone line in addition to telephone line 117 extend from NIU 139 into customer premises 110, these additional lines, however, are not shown in FIG. 1. In a well-known manner, central office 105 receives the CATV signals via, e.g., satellites, and causes the signals to populate a pre-assigned frequency band on cable 135, which is separate from the frequency bands occupied by the voice communications.

To realize the telephone service, power node 141 is used to provide, through power line 147, loop current to the telephone lines including telephone line 117 in premises 110. However, the loop current available for each telephone line is limited. In this illustration, the loop current limit is about 22 mA.

As shown in FIG. 1, multiple telephones including telephones 119 and 121 are connected to telephone line 117 in a parallel manner. When any one of telephones 119 and 121 is in use, and conducts electricity, known as an "off-hook" condition, it draws loop current from telephone line 117 for voice communications. In this example, connected to the same telephone line 117 are two different, commercially available telephones 119 and 121, which is common.

Figure 2:
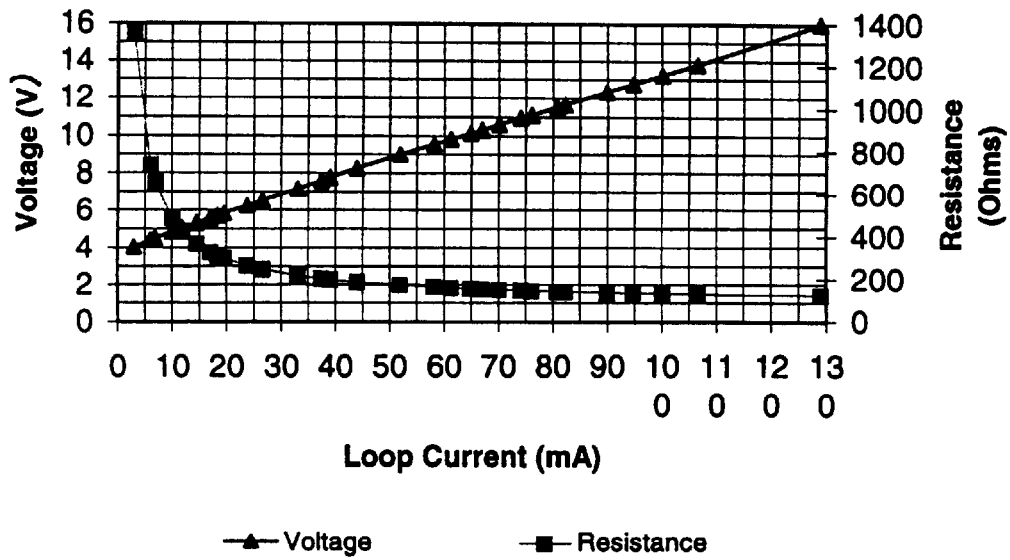
FIG. 2 is a plot describing the electrical characteristics of a first commercially available telephone which may be used in the arrangement of FIG. 1.

By way of example, telephone 119 possesses electrical characteristics described in FIG. 2, which is a plot of the operating voltage and resistance of telephone 119 versus the loop current drawn thereby when it is in an off-hook condition. As shown in FIG. 2, the resistance of telephone 119 varies with the loop current drawn. Specifically, the higher the loop current, the lower is the resistance. The resulting operating voltage, however, increases with the loop current.

Figure 3:
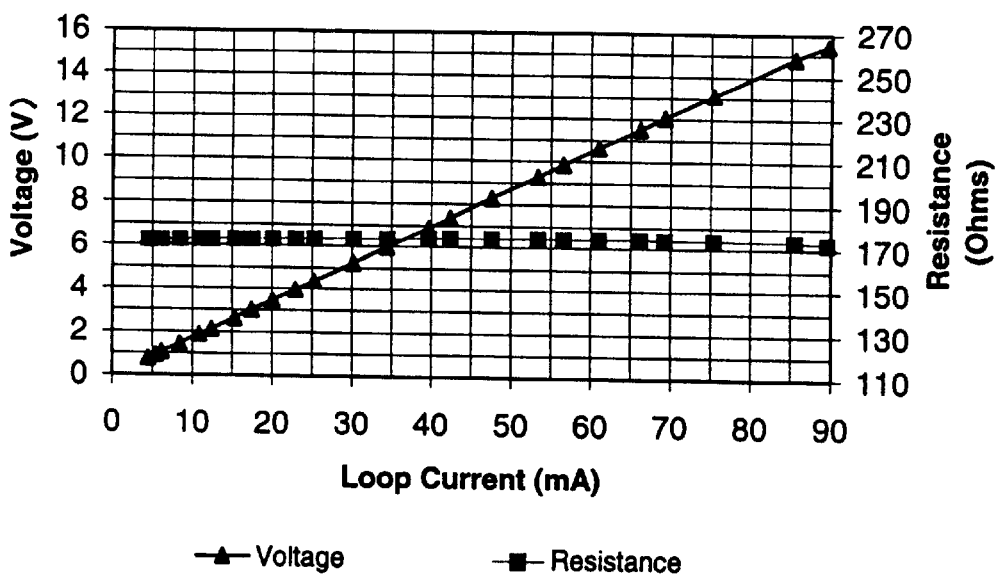
FIG. 3 is a plot describing the electrical characteristics of a second commercially available telephone which may be used in the arrangement of FIG. 1.

On the other hand, telephone 121 possesses electrical characteristics described in FIG. 3, which is a plot of the operating voltage and resistance of telephone 121 versus the loop current drawn thereby when it is in an off-hook condition. As shown in FIG. 3, unlike the resistance of telephone 119, the resistance of telephone 121 varies slightly with the loop current drawn. As a result, the operating voltage increases directly with the loop current.

When telephones 119 and 121 are simultaneously used by different users in customer premises 110 to participate in the same telephone conversation for example, each of the off-hook telephones draws loop current from the telephone line. In that case, limited by the total loop current available from line 117, which in this instance is 22.17 mA, telephone 119 draws only 0.97 mA of the total loop current, and operates with a resistance of 3,753 Ohms and at a voltage of 3.64 V, in accordance with its electrical characteristics of FIG. 2. Operating at the same voltage, telephone 121, with a resistance of 172 Ohms, however seizes the bulk of the loop current, i.e., 21.20 mA, in accordance with its electrical characteristics of FIG. 3. As a result, telephone 121 has more than sufficient loop current to drive its circuitry to effect the normal voice and touch tone operation. On the other hand, telephone 119 has insufficient loop current to drive its circuitry, causing its audio level to be significantly lower than the desired level. As a result, the user of telephone 119 can hardly hear the telephone conversation (or, for that matter, its dial tone also) and meaningfully participate in same.

I have recognized that the disproportionate distribution of the loop current from a telephone line amongst multiple off-hook telephones connected thereto is attributable to an imbalance of the loads imparted by the telephones to the line. Referring to FIG. 1, these loads in this instance include loads 151 and 153, which comprise telephone 121 contributing a resistance of 172 Ohms and telephone 119 contributing a resistance of 3,753 Ohms, respectively, and are connected in parallel to telephone line 117. In accordance with the invention, a balancing network is used to balance such loads to more evenly distribute the loop current supply to the telephones.

Figure 4:
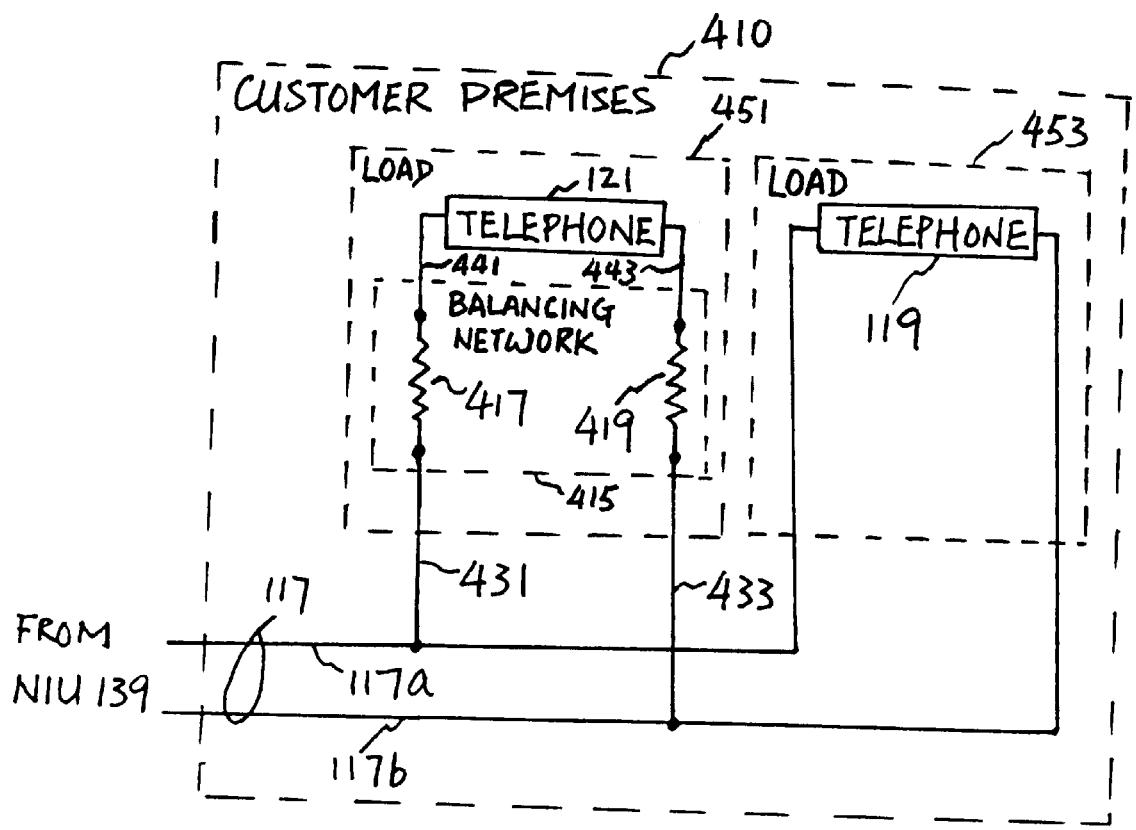
FIG. 4 illustrates a telephone network in accordance with the invention in customer premises.

FIG. 4 illustrates a telephone network in customer premises 410 embodying the principles of the invention. The telephone network in customer premises 410 is similar to that in customer premises 110 described before, except that the former includes balancing network 415 in accordance with the invention. In this illustrative embodiment, balancing network 415 comprises a pair of resistors, denoted 417 and 419. Resistors 417 and 419 are connected in series with the telephone having the least operating resistance (i.e., telephone 121 in this instance) when each telephone connected to the same telephone line is off-hook. That is, in this instance, resistor 417 is connected at its one end to telephone 121 through lead 441, and at its other end to wire 117a through lead 431. In addition, resistor 419 is connected at its one end to telephone 121 through lead 443, and at its other end to wire 117b through lead 433. In practice, the telephone having the least operating resistance can be identified by detecting any drop in its audio level when each other telephone connected to the same telephone line is off-hook. The drop, if any, should be the least compared with that of each other telephone.

By way of example, but not limitation, the values of resistors 417 and 419 in this instance are each 86.6 Ohms. As shown in FIG. 4, because of the inclusion of balancing network 415, the total loop current drawn by both telephones 119 and 121 in an off-hook condition is 21.63 mA (vs. 22.17 mA before). In addition, telephone 119 here operates with a resistance of 295 Ohms (vs. 3,753 Ohms before) and at a voltage of 4.72 V (vs. 3.64 V before), and draws 7.97 mA (vs. 0.97 mA before) loop current, in accordance with the electrical characteristics of FIG. 2. At the same time, telephone 121 operates with a resistance of 172 Ohms (same as before) and at a voltage of 2.35 V (vs. 3.64 V before), and draws 13.66 mA (vs. 21.20 mA before) loop current, in accordance with the electrical characteristics of FIG. 3.

It should be noted at this point that by virtue of the inclusion of balancing network 415, loads 451 and 453 here, which are connected in parallel to telephone line 117, become relatively balanced, with respect to loads 151 and 153 described before. In this instance, load 451, which includes resistors 417 and 419 and telephone 121, has a resistance of 2×86.6 Ohms+172 Ohms=345.20 Ohms. Load 453 including telephone 119 only has a resistance of 295 Ohms.

With the relatively balanced loads, telephones 119 and 121 in customer premises 410 are afforded a more balanced proportion of the loop current from telephone line 117, with respect to those in customer premises 110. As a result, telephone 119 has much more current to drive its circuitry, and its audio level is accordingly improved.

Figure 5:
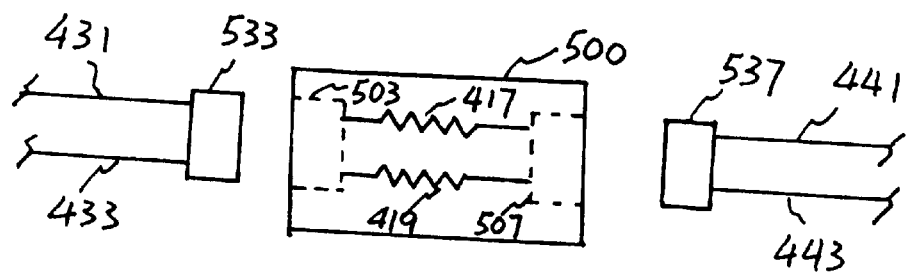
FIG. 5 illustrates a connector used in a connection in the telephone network of FIG. 4, which includes a balancing network in accordance with the invention.

In implementation, balancing network 415 in accordance with the invention may be incorporated in a conventional double female RJ-8 connector. The resulting connector, denoted 500, is illustrated in FIG. 5. Connector 500 is similar to the conventional connector, except that female modular jacks 503 and 507 in connector 500 are no longer connected to each other by conductors as in the conventional connector. Rather, in accordance with the invention, female modular jack 503 is connected to female modular jack 507 through resistors 417 and 419 constituting balancing network 415. Each resistor may be a metal film resistor with a shrink tubing covering for insulation.

To connect balancing network 415 to the rest of the telephone network in FIG. 4, conventional male modular jack 533 in FIG. 5 connected to leads 431 and 433 may be used to mate with female modular jack 503 in connector 500 while conventional male modular jack 537 connected to leads 441 and 443 may be used to mate with female modular jack 507 in same.

The foregoing merely illustrates the principles of the invention. It will thus be appreciated that a person skilled in the art will be able to devise numerous arrangements which, although not explicitly shown or described herein, embody the principles of the invention and are thus within its spirit and scope.

For example, in the disclosed embodiment, only two telephones are illustratively connected to telephone line 117, and the inventive balancing network is illustratively connected to the telephone having a smaller operating resistance when both telephones are off-hook. However, the invention is equally applicable to where more than two telephones are connected to the same telephone line. In that case, one or more of the telephones having smaller operating resistances can each be connected to the inventive balancing network.

Finally, in the disclosed embodiment, balancing network 415 illustratively comprises resistors. However, the make-up of the balancing network is not so limited. In accordance with the invention, the balancing network comprises one or more electrical circuits and/or devices which affect the resistance of at least one of the loads connected in parallel to a telephone line to balance loop current supplies to the telephones constituting at least part of the loads.

I claim:

1. A communications arrangement including a plurality of loads, each load having a resistance, comprising:
  a communications line, the plurality of loads being connected to the communications line;
  a plurality of communications apparatuses, each load including a respective one of the communications apparatuses; and
  a circuit for affecting a resistance of at least one of the loads to substantially balance resistance of the loads,
  wherein the plurality of the loads are connected to the communications line in a parallel manner.

2. The arrangement of claim 1 wherein the communications line includes a telephone line.

3. The arrangement of claim 1 wherein the plurality of communications apparatuses include telephone equipment.

4. The arrangement of claim 1 wherein the circuit is connected to at least one of the communications apparatuses.

5. The arrangement of claim 1 wherein the communications line supplies current to at least one of the communications apparatuses.

6. The arrangement of claim 5 wherein a resistance of the at least one of the communications apparatuses varies with an amount of the current supplied thereto.

7. The arrangement of claim 1 wherein the circuit includes at least one electrical device.

8. The arrangement of claim 7 wherein the electrical device includes a resistor.

9. A method of us in a communications arrangement including a plurality of loads connected to a communications line, a plurality of communications apparatuses, each load including a respective one of the communications apparatuses and having a resistance, the method comprising the steps of:
  supplying current to the plurality of loads through the communications line;
  affecting a resistance of at least one of the loads to change a proportion of the current supplied to a communications apparatus in the at least one of the loads; and
  using each communications apparatus simultaneously.

10. The method of claim 9 wherein the affecting step includes the step of increasing the resistance.

11. a circuit connected to the at least one of the communications apparatuses for affecting a proportion of the current supplied to the at least one of the communications apparatuses.

12. The arrangement of claim 11 wherein the communications line includes a telephone line.

13. The arrangement of claim 11 wherein the plurality of communications apparatuses include telephone equipment.

14. The arrangement of claim 11 comprising a telephone network.

15. The arrangement of claim 10 wherein a resistance of at least one of the communications apparatuses varies with an amount of current supplied thereto.

16. The arrangement of claim 10 wherein the circuit includes at least an electrical device.

17. The arrangement of claim 16 wherein the electrical device includes a resistor.

* * * * *